US006658469B1

(12) United States Patent
Massa et al.

(10) Patent No.: US 6,658,469 B1
(45) Date of Patent: Dec. 2, 2003

(54) METHOD AND SYSTEM FOR SWITCHING BETWEEN NETWORK TRANSPORT PROVIDERS

(75) Inventors: Michael T. Massa, Seattle, WA (US); Alessandro Forin, Redmond, WA (US); Vadim Eydelman, Redmond, WA (US); Timothy M. Morre, Bellevue, WA (US); Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/453,781

(22) Filed: Dec. 3, 1999

Related U.S. Application Data

(60) Provisional application No. 60/112,777, filed on Dec. 18, 1998, and provisional application No. 60/159,316, filed on Oct. 14, 1999.

(51) Int. Cl.[7] ............................................. G06F 15/173
(52) U.S. Cl. ........................ 709/224; 709/224; 709/227
(58) Field of Search ................................. 709/200, 203, 709/223, 224, 217, 219, 227

(56) References Cited

U.S. PATENT DOCUMENTS 5,473,679 A * 12/1995 La Porta et al. ............ 370/410
6,108,701 A *  8/2000 Davis et al. ................ 709/224
6,157,634 A * 12/2000 Mehta et al. ............... 370/351

OTHER PUBLICATIONS

Rodrigues et al, "High–Performance Local Area Communication With Fast Sockets", Proceedings of Usenix Annual Technical Conference, 1997.*

Ryan et al, "SCI for Local Area Networks", ISBN 82–7368–180–7, Jan. 1998.*

S.H. Rodrigues et al., "High–Perfomance Local Area Communication With Fast Sockets", *Proceedings of Usenix Annual Technical Conference*, 1997.

S.J. Ryan et al., "SCI for Local Area Networks", ISBN 82–7368–180–7.

"Virtual Interface Architecture Specification", Dec. 4, 1997, available from www.viarch.org.

* cited by examiner

*Primary Examiner*—Hosain T. Alam
*Assistant Examiner*—Philip B. Tran
(74) *Attorney, Agent, or Firm*—Leydig, Voit & Mayer, Ltd.

(57) ABSTRACT

A method and system for directing data transfers between applications and devices residing on different computers or devices using a transport provider switch to determine whether to use a primary transport provider or one of a plurality of alternative transport providers. When an application or device requests to transfer data with another application or device, the transport provider switch detects whether the applications and devices are served by an alternative transport provider and, if so, directs that alternative transport provider to transfer the data. To improve data transfer performance, the switch employs an adaptive protocol that adapts the way data is transferred by observing when an application that is receiving data posts a receive buffer and detects the receive buffer's size. Based upon the application's or device's behavior, the switch transfers the data in a mode that is best suited for the application. A credit-based sequencing method is used to coordinate message transfers.

27 Claims, 6 Drawing Sheets

METHOD AND SYSTEM FOR SWITCHING BETWEEN NETWORK TRANSPORT PROVIDERS

RELATED APPLICATIONS

This application claims the benefit of U.S. Provisional Application No. 60/112,777, filed Dec. 18, 1998 and U.S. Provisional Application No. 60/159,316, filed Oct. 14, 1999.

TECHNICAL FIELD

This invention relates generally to networked communications and, more particularly, relates to network communications between computer applications using different network transport providers.

BACKGROUND OF THE INVENTION

Computer networking allows applications residing on separate computers or devices to communicate with each other by passing data across the network connecting the computers. Traditional network media, such as Ethernet and ATM, are not reliable for application-to-application communication and provide only machine-to-machine datagram delivery service. In order to provide reliable application-to-application communication, transport protocol software run on the host machine must provide the missing functionality.

Typically, the protocol software for network communication is implemented as a combination of a kernel-mode driver and a user-mode library. All application communication passes through these components. As a result, application communication consumes a significant amount of the host processor's resources and incurs additional latency. Both of these effects degrade application communication performance. This degradation significantly limits the overall performance of communication intensive applications, such as distributed databases.

Recently, a new class of communication interconnects called System Area Networks (SANs) has emerged to address the performance requirements of communication intensive distributed applications. SANs provide very high bandwidth communication, multi-gigabytes per second, with very low latency. SANs differ from existing media, such as Gigabit Ethernet and ATM, because they implement reliable transport functionality directly in hardware. Each SAN network interface controller (NIC) exposes individual transport endpoint contexts and demultiplexes incoming packets accordingly. Each endpoint is usually represented by a set of memory-based queues and registers that are shared by the host processor and the NIC. Many SAN NICs permit these endpoint resources to be mapped directly into the address space of a user-mode process. This allows application processes to post messaging requests directly to the hardware. This design consumes very little of the host processor's resources and adds little latency to communication. As a result, SANs can deliver extremely good communication performance to applications.

Most distributed applications are designed to communicate using a specific transport protocol and a specific application programming interface (API). A large number of existing distributed applications are designed to utilize the Transmission Control Protocol/Internet Protocol (TCP/IP) suite and some variant of the Berkeley Sockets API, such as Windows Sockets.

In general, each SAN implementation utilizes a custom transport protocol with unique addressing formats, semantics, and capabilities. Often, the unique capabilities of a SAN are only exposed through a new communication API as well. Since existing applications are usually designed to use one primary transport protocol and API—most often TCP/IP and Sockets—there have been relatively few applications that can take advantage of the performance offered by SANs. In order for existing applications to use a SAN, the TCP/IP protocol software must currently be run on top of it, eliminating the performance benefits of this media.

In order to provide the performance benefit of SANs without requiring changes to application programs, a new component is inserted between the communication API used by the application, e.g. Windows Sockets, and a SAN transport provider. This new component (hereinafter network transport switch) emulates the behavior of the primary transport provider that the application was designed to utilize, e.g. TCP/IP, while actually utilizing a SAN transport provider to perform data transfer. In situations where the SAN transport provider is not suitable for carrying application communication, e.g. between sub-networks of an internetwork, the network transport switch continues to utilize the primary transport provider. A mechanism is provided within the switch for automatically determining whether to utilize the primary transport provider or alternative transport provider.

One example of this approach is described in a paper titled "SCI for Local Area Networks" by Stein Jorgen Ryan and Haakon Bryhni, ISBN 82-7368-180-7 (hereinafter SCILAN). Another example is described in a paper titled "High Performance Local Area Communication with Fast Sockets", by Steven H. Rodrigues, Thomas E. Anderson, and David E. Culler, in Proceedings of Usenix Annual Technical Conference, 1997 (hereinafter Fast Sockets).

The SCILAN architecture provides for utilization of an alternative transport provider for communication between applications residing on computers systems connected to an SCI network. A known IP address range is assigned to the SCI network. If an application uses an address in this range to identify another application with which it would like to communicate, then the alternative transport provider is used. If an address is specified from a different range of the IP address space, then the standard TCP/IP provider is used. Note that in this architecture, the TCP/IP provider must use a separate physical network from the SCI network.

Fast Sockets also provides for utilization of an alternative transport provider for communication between applications residing on computer systems connected to a system area network. When an application tries to establish a connection, Fast Sockets applies a hash function to the destination TCP port address in order to obtain an alternative port address. Fast Sockets then tries to establish a connection to the alternative port address using TCP/IP. If this connection attempt succeeds, Fast Sockets uses the connection to negotiate a separate connection over the alternative transport provider. If the first connection attempt fails, Fast Sockets establishes a connection to the original port address supplied by the application using TCP/IP. When an application issues a request to listen for connections on a specific TCP port address, Fast Sockets applies the hash function to the address supplied by the application and then listens on both the requested port and the generated alternative port. This approach requires that two connection attempts be made regardless of whether TCP/IP is ultimately used to carry the application's data. This approach also overloads the TCP port address space and will fail if the alternative port address generated during a connection attempt is already in use by another application.

In order to emulate the data transfer behavior of the primary transport provider when utilizing an alternative transport provider, a network transport switch must implement a protocol that controls the transfer of data from source memory buffers supplied by a first application into destination memory buffers supplied by a second application. This aspect of data transfer is known as flow control.

The TCP/IP protocol provides for data transfer in the form of an unstructured stream of bytes. It is the responsibility of the applications using the TCP/IP protocol to encode the data stream to mark the boundaries of messages, records, or other structures. The Berkeley Sockets and Windows Sockets communication APIs offer applications a great deal of flexibility for receiving data. Applications may request to receive data directly into a specified memory buffer, request to receive a copy of a prefix of the data directly into a specified buffer without removing the original data from the byte stream (peek), or request to be notified when data is available to be received and only then request to receive the data or peek at it. Since TCP/IP provides an unstructured byte stream, an application may request to receive data from the stream into a specified memory buffer in any size portion, e.g. a single byte or thousands of bytes. The flexibility of these communication APIs and the unstructured nature of the TCP/IP data stream make it difficult to implement a flow control protocol that works efficiently for all applications.

SUMMARY OF THE INVENTION

The present invention provides an improved network transport switch to enable applications designed for a primary transport provider to use one of a plurality of alternative transport providers that offer some benefit over the primary transport provider, such as higher performance. When an application or a device attempts to communicate with another application or device, the network transport switch determines whether to use the primary transport provider or one of the alternative transport providers to carry the communication. A table of network addresses supported by alternative providers is automatically constructed and maintained. The switch compares the network addresses of the sending and receiving application or device to the table of network addresses to determine whether they both are on one of the alternative network interconnect systems. If the applications or devices are attached to the same alternative network interconnect system, the switch establishes communication directly through the alternative transport provider for that alternative network interconnect system. If the two applications are attached to different networks, then the switch utilizes the primary transport provider. When the switch establishes communication through an alternative transport provider, it emulates the semantics of the primary transport provider such that the communicating applications are unaware that an alternative transport provider is in use.

When using an alternative transport provider, the network transport switch achieves improved data transfer performance by applying an adaptive flow control protocol that adjusts its data transfer strategy based on the behavior of the communicating applications. The switch monitors the receiving application to determine when the receiving application posts buffers to receive the data and also detects the size of the buffers and then changes the way it directs data to be transferred between the applications based on when buffers were posted and buffer size. Large data blocks are transferred using remote direct memory access transfers if the receiving application's receiving buffers are of sufficient size or through messages if the receiving buffers are not large enough. Through this adaptive mechanism, the network transport switch attempts to maximize the communication bandwidth and minimize the communication latency observed by the communicating applications.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
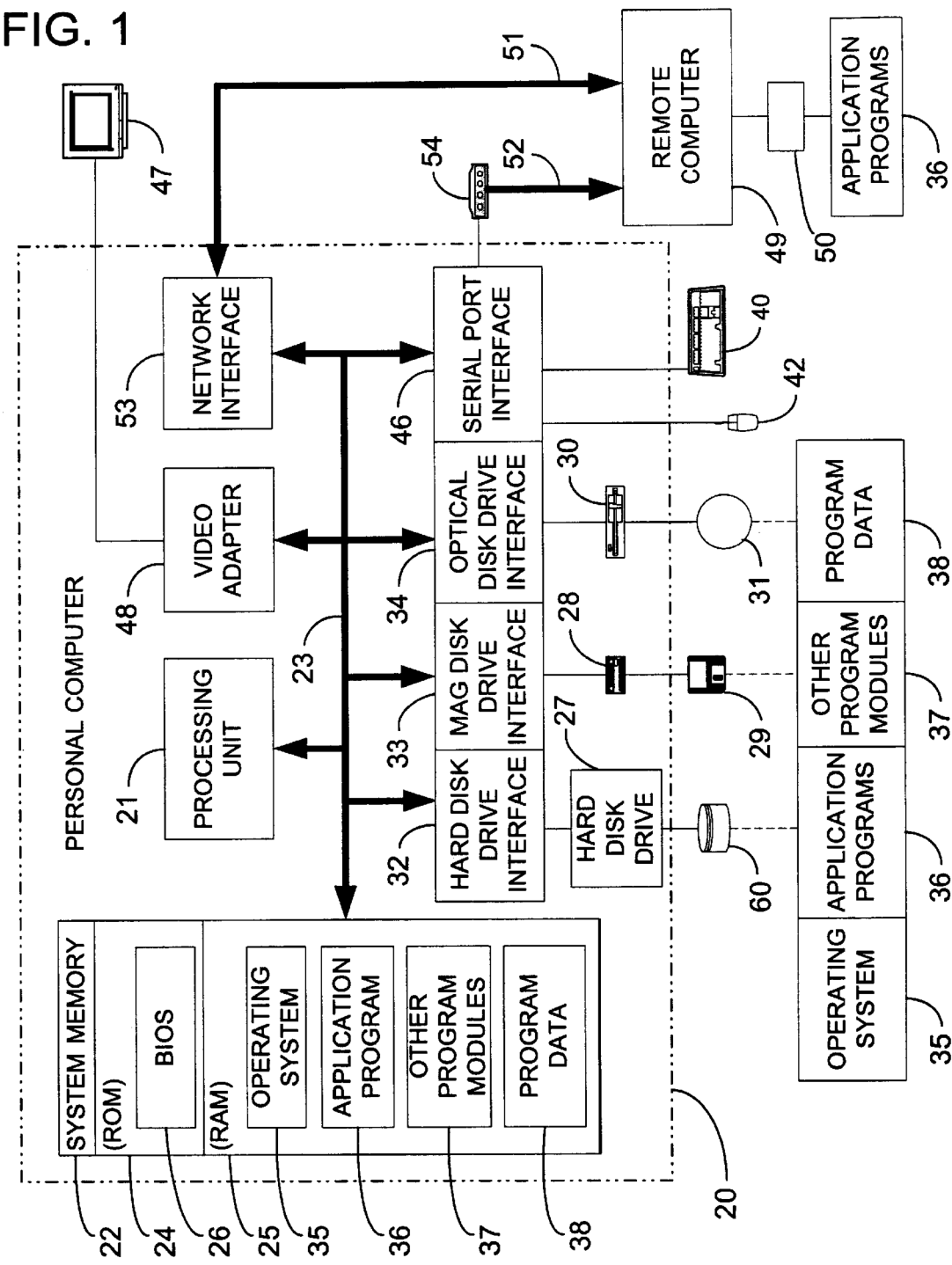
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
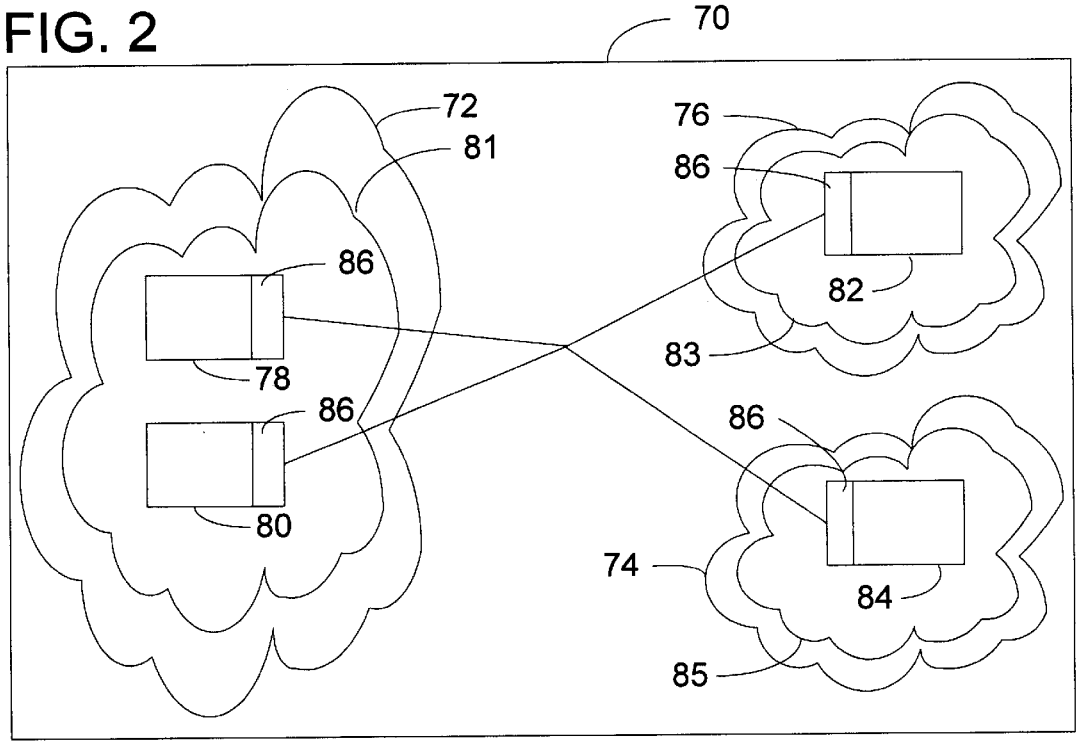
FIG. 2 is a block diagram illustrating a network system having a plurality of sub-networks connected by a transport switch of the invention.

The present invention is directed to the use of a network transport provider switch that selects alternative network transport providers of a computer system for delivering communications between computer applications when the alternative network transport providers offer some benefit, such as improved performance, over the primary network transport provider. When using alternative transport providers, the network transport switch achieves improved data transfer performance by applying an adaptive flow control protocol that adjusts its data transfer strategy based on the behavior of the communicating applications. FIG. 2 shows a representative environment in which the switches 86 according to the invention operate. The environment includes a distributed system 70 having local sub-networks 72, 74, 76. Local sub-network 72 has computers 78, 80, and local sub-networks 74, 76 have computers 82 and 84 respectively. It should be noted that distributed system 70 may have additional local sub-networks and local sub-networks 72, 74, 76 may have additional computers. Each sub-network 72, 74, 76 is served by a transport provider 81, 83, 85 for providing communication between computers and between applications residing on computers. Each transport provider may be a primary transport provider, such as TCP/IP, or an alternative transport provider. When an application makes a call to communicate with another application, transport provider switch 86, which resides on each computer 78, 80, 82, 84, chooses whether to utilize a primary transport provider, such as TCP/IP, to provide the communication service or an alternative transport provider that is capable of providing the communication service. Typically, the alternate transport provider can provide communication only within a local sub-network.

In one embodiment of the invention, one such alternative transport provider capable of providing the communication service is a System Area Network (SAN) provider that offers data transfer through messages and RDMA. The operation of the invention will be described in the Windows NT operating system with a SAN provider installed, but it should be understood that the invention can be used with other operating systems and other alternative providers capable of providing the communication service.

In order to interact directly with a SAN network interface card (NIC) from the Windows NT user-mode, all memory used in data transfer operations are preferably locked into physical memory. The SAN NICs contain page tables that map virtual addresses into physical addresses. The data buffers used for data transfers are preferably registered with the NIC's driver, which manages the page table. Some SAN NICs associate a handle with each registered memory region. The handle corresponding to a data buffer is supplied in data transfer requests submitted to these SAN NICs.

Most SANs offer two different modes of data transfer. One is used mainly for small data transfers and the other for large data transfers. Most SANs transfer small amounts of data through messages. Others use processor load/store operations on remote memory mapped into the initiator's address space. These mechanisms are primarily intended to transfer control information. Typical transfer sizes range from a few bytes up to an operating system memory page.

SANs provide bulk data transfer through a Remote Direct Memory Access (RDMA) mechanism. The initiator specifies a buffer on the local system and a buffer on the remote system. Data is then transferred directly between the two locations by the NICs without host CPU involvement at either end. Both read and write transfers can be supported.

Figure 3:
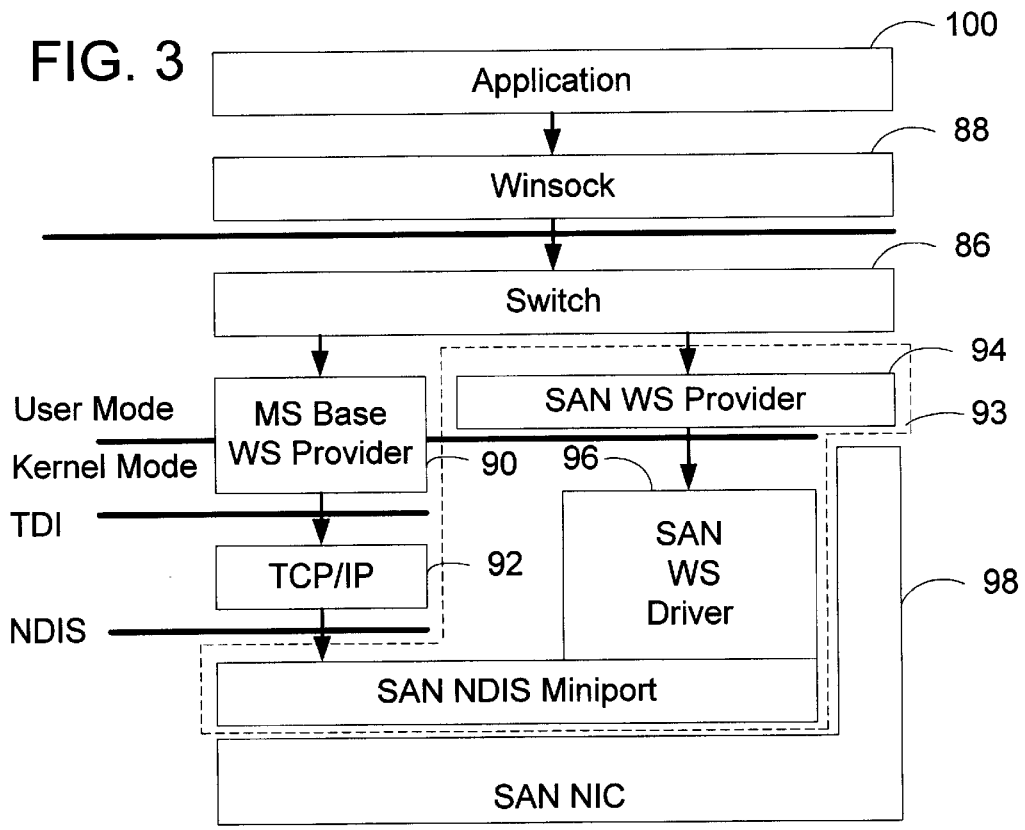
FIG. 3 is a block diagram illustrating an embodiment of an operating system employing a transport switch for directing data for a user mode application through different transport providers.

FIG. 3 shows an architectural overview of an embodiment of the transport provider switch 86 according to the invention implemented in the Windows NT operating system of Microsoft Corporation. For the remainder of the description of this embodiment, transport provider switch 86 will be called switch 86. In this embodiment, the switch 86 is used for user mode applications. Winsock 88 is a Windows Sockets interface that implements an Application Programming Interface (API) to allow applications to communicate with applications on other machines via a standard protocol such as TCP/IP. MS Base WS Provider 90 is the Microsoft Windows Sockets provider, consisting of a kernel driver and a set of user-mode dynamic link libraries (DLLs), for transports that expose a Transport Driver Interface (TDI) interface. TCP/IP 92 is the standard TCP/IP protocol driver and, in this embodiment, is the primary transport provider. The alternative transport provider is the SAN provider 93 and it consists of the user mode portion SAN WS Provider 94 and the kernel mode portion SAN WS Driver 96.

Each SAN NIC 98 appears in the system as both a Network Driver Interface Specification (NDIS) provider and a Windows Sockets provider. The SAN NDIS provider is required in order to support communication using the TCP/IP protocol driver 92 and it emulates a standard media type such as Ethernet or ATM. The SAN provider 93 exports the native transport semantics of the SAN interconnect such as address family and message-orientation. The kernel-mode portion SAN WS Driver 96 of the SAN provider 93 may be contained in the same driver as the SAN NDIS provider or in a separate driver.

In the embodiment of FIG. 3, the switch 86 becomes the first visible TCP/IP provider for user-mode applications. This makes it the default choice for user-mode applications that open sockets for communication in Windows NT. For clarity, the switch 86 is shown as a separate box. The switch 86 can be part of the same dynamic link library (dll) which implements the user mode portion of the MS Base WS Provider 90. The switch's top and bottom edge interfaces conform to the Windows Sockets Service Provider Interface (WS SPI) as is known to those skilled in the art. The bottom edge interface utilizes extensions to the WS SPI needed to take advantage of SAN capabilities. These extensions are: (1) to initiate use of a WinSock service provider by the switch 86, (2) to register a memory buffer used as a local source or a target buffer in remote direct access memory operations, (3) to deregister a memory buffer, (4) to transfer data from a specified buffer or buffer array in the local address space to memory in the remote peer's address space using remote direct memory access, and (5) to transfer data from a memory in the remote peer's address space to a specified buffer or buffer array in the local address space.

When the switch 86 is loaded, it discovers all of the SAN providers 93 by reading the list of the SAN provider ID's located in the machine's configuration database and initializes any SAN providers that it detects. When the switch 86 detects that a new SAN provider has been installed, it queries the SAN provider to get a list of IP addresses assigned to the NICs under its control. During its startup processing, each SAN provider determines the list of IP addresses assigned to its NICs through the Windows NT kernel-mode transport interface, known as the Transport Driver Interface (TDI). The switch 86 builds a table mapping local IP subnets to SAN providers.

When the switch 86 receives a call from an application 100 to create a socket, it invokes the TCP/IP provider 92 to create a socket. The switch 86 returns the socket descriptor generated by the TCP/IP provider 92 to the application 100. The switch 86 also stores this descriptor in a private data structure associated with the socket. If the application 100 issues a call to assign a local name to the socket, the switch 86 forwards the call to the TCP/IP provider 92 as well.

When an application 100 issues a request to the switch 86 to establish a connection to a peer or to listen for incoming connections from peers, the switch 86 decides which provider to use to service the request. Each peer has at least one standard IP address assigned to it for each alternative network interconnect to which it is attached. When the switch 86 receives a request from an application 100 to connect to a peer, the switch 86 compares the IP address of the peer against its mapped table of local IP subnets served by SAN providers. If the peer's IP address is on one of the subnets served by SAN providers, the switch 86 invokes the corresponding SAN provider to create a socket and assign a local name to the socket.

In the embodiment of FIG. 3, the corresponding SAN provider will be the SAN provider 93. For purposes of clarity, FIG. 3 only shows one SAN provider. The switch 86 continues to process the application's connect request using the socket created by the SAN provider 93. If the peer's IP address is not served by the SAN Provider 93, the switch 86 uses the TCP/IP provider 92 to process the application's connect request using the socket previously created by the TCP/IP provider 92. If the SAN provider 93 fails to process the application's connect request, the switch 86 closes the socket created by the SAN provider 93. The switch 86 then forwards the connect request to the TCP/IP provider 92 to process the application's connect request. In this way, the switch accommodates communication with applications on computer systems that do not support the alternative network providers, e.g. the computer systems that do not support the switch mechanism. Note that it is the responsibility of the SAN provider 93 to translate the IP address of the peer, supplied by the switch 86 in the connect request, into the SAN provider's 93 native format and locate the peer on the network.

When an application calls to listen for incoming connection requests from peers, the switch 86 forwards the request to the TCP/IP provider 92 to listen for connection requests by other applications. The switch 86 consults the table of local IP subnets served by SAN providers to determine if the local name specified in the listen request is on a subnet served by a SAN provider. If the application is served by the SAN provider 93, the switch 86 also creates and listens on an additional socket using the SAN provider 93 and binds that socket to the same IP address and TCP port as the socket created by the TCP/IP provider 92.

When an application on a remote computer makes a connection attempt and the remote computer is on an IP subnet serviced by the SAN provider 93, the switch 86 will receive this request through the SAN provider 93 and will proceed to establish the connection. However, if the remote computer is not on an IP subnet serviced by the SAN provider 93, or if the remote computer does not support alternative transport providers, the connection request will arrive and be serviced by the MS Base WS Provider 90.

Although FIG. 3 shows a single SAN NIC, it should be appreciated that a system may contain multiple SAN NICs. Each SAN NIC 98 may be accessible through its own SAN WS provider 94. On a system with many. SAN NICs, there may be multiple SAN WS providers, some of which control one NIC and some of which control several NICs. The switch 86 transparently manages application access to all installed SAN WS providers. Note that all SAN NICs will be accessible through the standard TCP/IP provider 92. A system may also have multiple LAN/WAN NICs (e.g. Ethernet). The switch 86 does not interfere with communication over LAN/WAN NICs, which are utilized through the TCP/IP provider 92.

Figure 4:
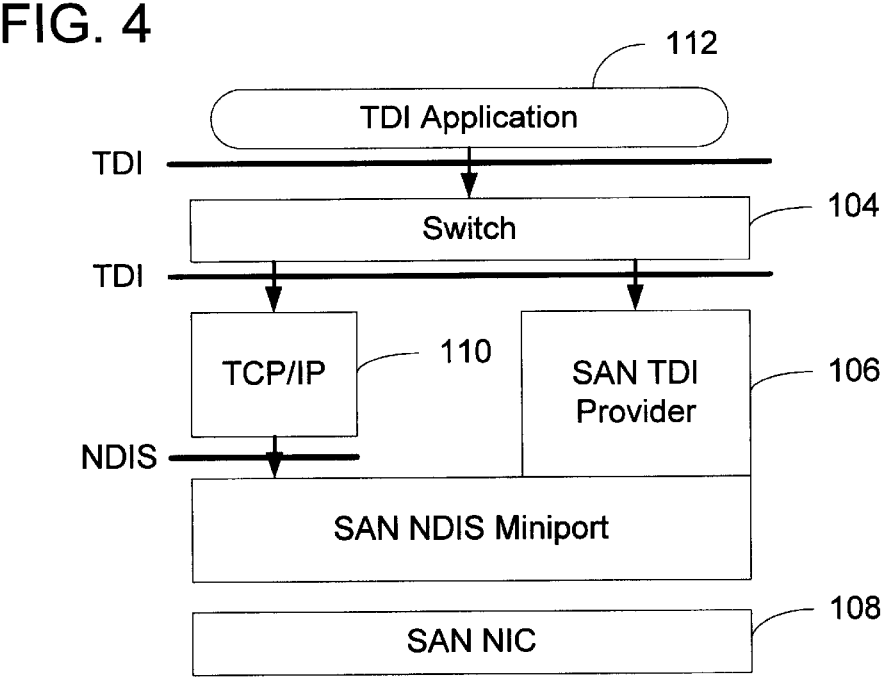
FIG. 4 is a block diagram illustrating an embodiment of an operating system employing a transport switch for directing data for a kernel-mode application through different transport providers.

FIG. 4 shows an architectural overview of an alternative embodiment of the switch 104 according to the invention implemented in a computer system that allows kernel-mode applications to communicate with other applications via an alternative transport provider such as a system area network. Each SAN NIC appears in the system as an NDIS provider and a Transport Driver Interface (TDI) provider 106. TDI is a low-level network application programming interface (API) that is exposed at the top edge of all Windows NT transport providers. These providers may be contained in the same driver or in separate drivers.

The SAN NDIS provider supports the TCP/IP protocol driver, and allows applications access to the SAN NIC 108 through the TCP/IP TDI provider 110. Kernel networking applications, such as the Windows NT File Redirector and Server, access the network through the TCP/IP TDI provider 110.

The switch 104 intercepts application requests that pertain to SAN NICs and determines, on a per-connection basis, if the requests can be fulfilled through the SAN TDI provider 106. The switch 104 diverts supported requests to the SAN TDI provider 106, forming a fast path to the SAN NIC 108. The switch 104 enhances the SAN TDI provider 106 by emulating missing TCP/IP functionality. In this embodiment, requests pertaining to connection-less traffic are handled through the TCP/IP provider 110.

Although FIG. 4 shows a single SAN NIC, it should be appreciated that a system may contain multiple SAN NICs. Each SAN NIC 108 may be accessible through its own SAN TDI provider 106. On a system with many SAN NICs, there may be multiple SAN TDI providers, some of which control one NIC and some of which control several NICs. The switch 104 transparently manages application access to all installed SAN TDI providers. Note that all SAN NICs will be accessible through the standard TCP/IP TDI provider 110. A system may also have multiple LAN/WAN NICs (e.g. Ethernet). The switch 104 does not interfere with communication over LAN/WAN NICs, which are utilized through the TCP/IP provider 110.

The switch 104 can also be implemented as a layered Windows NT filter driver. The switch 104 creates a device object to attach to the TCP device object stack and uses this mechanism to intercept all TCP requests. The switch 104 is both a TDI client and TDI provider, in that it interacts with the TCP/IP 110 and SAN providers 106 through the TDI interface while providing the TDI interface to TCP/IP and SAN clients.

The switch 104 is installed at the TDI level between TDI applications 112 and the TCP/IP TDI provider 110. It should be appreciated that the switch 104 can also be combined with the TCP/IP TDI provider 110. For clarity, the switch 104 is shown as a separate box. Depending on its implementation, it can be installed dynamically through the Windows NT services interface, or it can be configured in the machine's configuration database, the Windows NT Registry, to start up automatically with other network services as the system boots.

When the switch 104 is loaded, the switch 104 locates its configuration parameters in the Windows NT Registry. If the switch 104 is not combined with the TCP/IP TDI provider 110, one of its configuration parameters will be the name of the TCP device object, a device object created and owned by the TCP/IP driver 110. Requests for TCP services will flow through the TCP device object. The switch 104 creates a device object and attaches it to the TCP device object stack. This enables the switch's driver to intercept any TCP requests directed to the TCP/IP driver 110.

Once the mechanism to intercept TCP requests is enabled, the switch 104 discovers all of the SAN TDI providers. When a SAN TDI provider is first installed on the host system, it must write the name of its device object into the Windows NT Registry. The switch 104 locates these names and attempts to open each device object. The switch 104 will only successfully open device objects for SAN TDI providers that are currently loaded. The switch 104 obtains a reference to each SAN device object it opens. This allows the switch 104 to divert messages intended for the standard TCP/IP provider 110 to SAN providers 106. If no SAN TDI providers are currently loaded, the switch 104 passes all TCP/IP requests directly through to the TCP/IP driver.

If the switch 104 is implemented in its own driver, the switch 104 exports dispatch routines through its driver object to handle I/O requests from TCP/IP clients. The switch 104 only needs to export those routines that are exported by the TCP/IP driver 110. In addition, the switch 104 registers plug-and-play handlers so that it is notified of changes in the system's network components.

The switch 104 builds a table mapping IP subnets to SAN TDI providers 106. Each table entry holds the local IP address assigned to the SAN NIC 108, the subnet for that IP address, and a pointer to the device object for the SAN provider 106.

Establishing a TCP connection through TDI is a multi-step process. The switch 104 manages connection setup through the TCP/IP provider 110. SAN provider functionality is invoked only on demand.

When a TDI application 112 initiates a TCP connection, the switch 104 intercepts the request and extracts information containing the target address. It compares the target address against its table of local IP subnets. If the target address is mapped to a SAN subnet, the switch 104 attempts to establish the connection through the SAN provider 106. If the target address cannot be mapped to a SAN provider 106, the switch 104 attempts the connection through the TCP/IP provider 110. If a TCP connection is established through a SAN provider 106, the switch 104 begins session negotiation and flow control by exchanging control messages with its peer.

Figure 5:
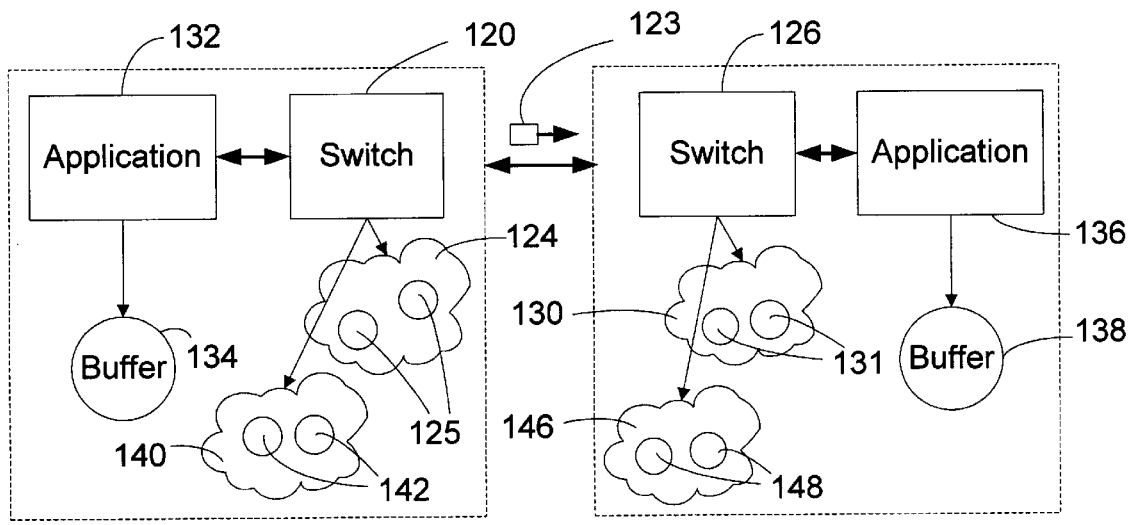
FIG. 5 is a block diagram illustrating a data transfer between two applications connected to transport switches using an alternative transport provider.

An adaptive flow control protocol is utilized to improve data transfer performance. FIG. 5 illustrates a data transfer between two applications 132, 136 connected to transport switches 120, 126 using an alternative transport provider 93, 106. If the SAN provider 93, 106 accepts the request to connect, the switches 120, 126 arrange a session with each other. The local switch 120 associates a set of receive buffers 124 and send buffers 140 with the connection and sends a message 123 to the remote switch 126. A message 123 can be sent by either switch. The message 123 includes the number of buffers in the set of receive buffers 124.

The remote switch also associates a set of receive buffers 130 and send buffers 146 with the connection. It should be appreciated that the receive buffers and send buffers can be combined into a single set of buffers. The SAN provider 93 buffers the first message sent if the remote switch 126 does not post the receive set buffers 130 before the first message is sent. It should be appreciated that the SAN provider 93 could also buffer other messages. The remote switch 126 sends a response to the message and the response includes the number of buffers in the set of receive buffers 130.

Each switch 120, 126 provides a flow control protocol to synchronize data transfer for small data transfers and large data transfers. One reason for this is that the applications 132, 136 may exhibit different behavior when receiving data. The application may not post a set of receiving buffers until it is informed that data is available to be received or the application may post a set of receiving buffers when it requests to receive data. The application's set of receiving buffers may also be large or small. The set of receiving buffers could be a single buffer or an array of buffers. If the receiving buffer set is large enough, bulk data transfer through Remote Direct Memory Access (RDMA) as known by those skilled in the art is used. The threshold size for using bulk data transfer is based upon justifying the cost of initiating RDMA. Each RDMA operation has a cost which is a function of the control messages exchanged by the switches 120, 126, and the SAN NIC hardware operations needed to support RDMA operation. The switch 120, 126 queries the SAN provider for the threshold size. Typically, the threshold size for a SAN provider is in the range of 2 KB to 4 KB. It should be noted that RDMA could be used for smaller data sizes than the threshold size.

After the connection is established, one of the applications 132, 136 requests that data be sent to or received from the other application. For purposes of illustration, application 132 issues a request to the switch 120 to receive data from application 136. Application 132 becomes a receiving application and application 136 becomes a sending application. Application 132 may post an initial receiving buffer set 134 or it may wait until it gets notice that data is available to be received.

When application 136 makes a request to switch 126 to send the data, the application 136 posts the data in a transmission buffer 138. The switch 126 detects the data size and decides whether to use RDMA data transfer or messages to transfer the data to application 132.

Figure 6:
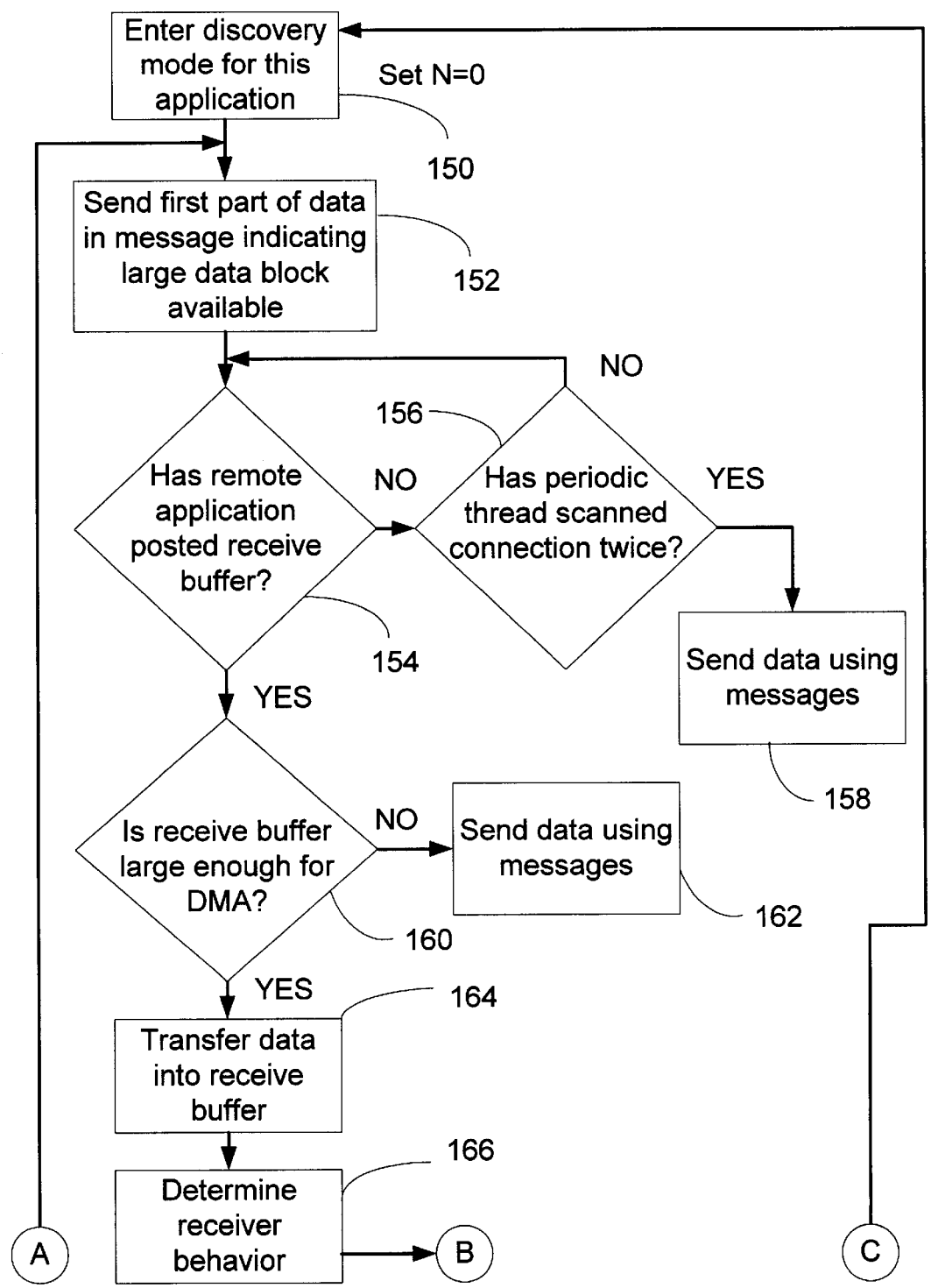
FIG. 6 is a flow chart illustrating a first portion of a process for transferring large data blocks.
Figure 7:
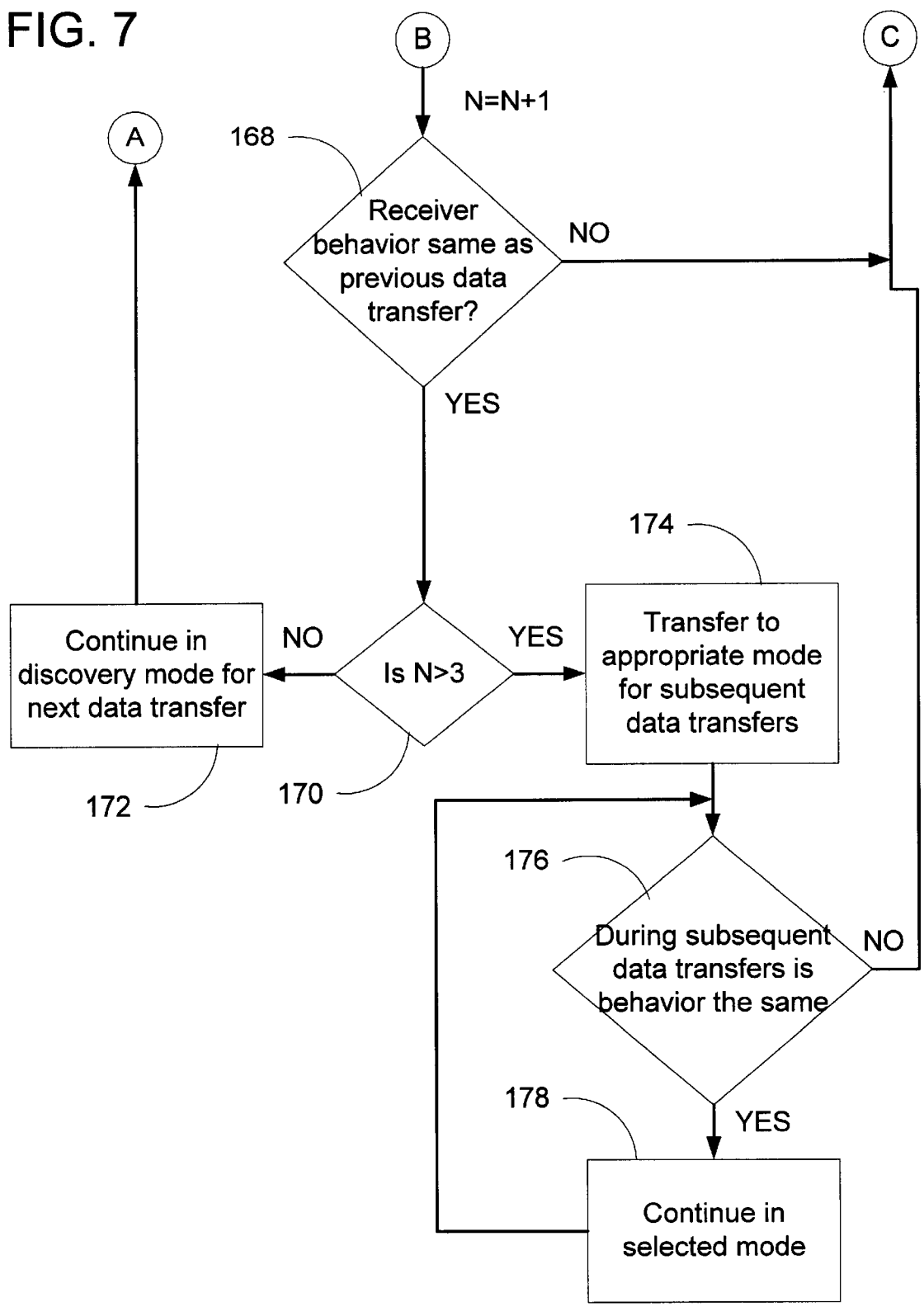
FIG. 7 is a flow chart illustrating a remaining portion of the process for transferring large data blocks.
Figure 8:
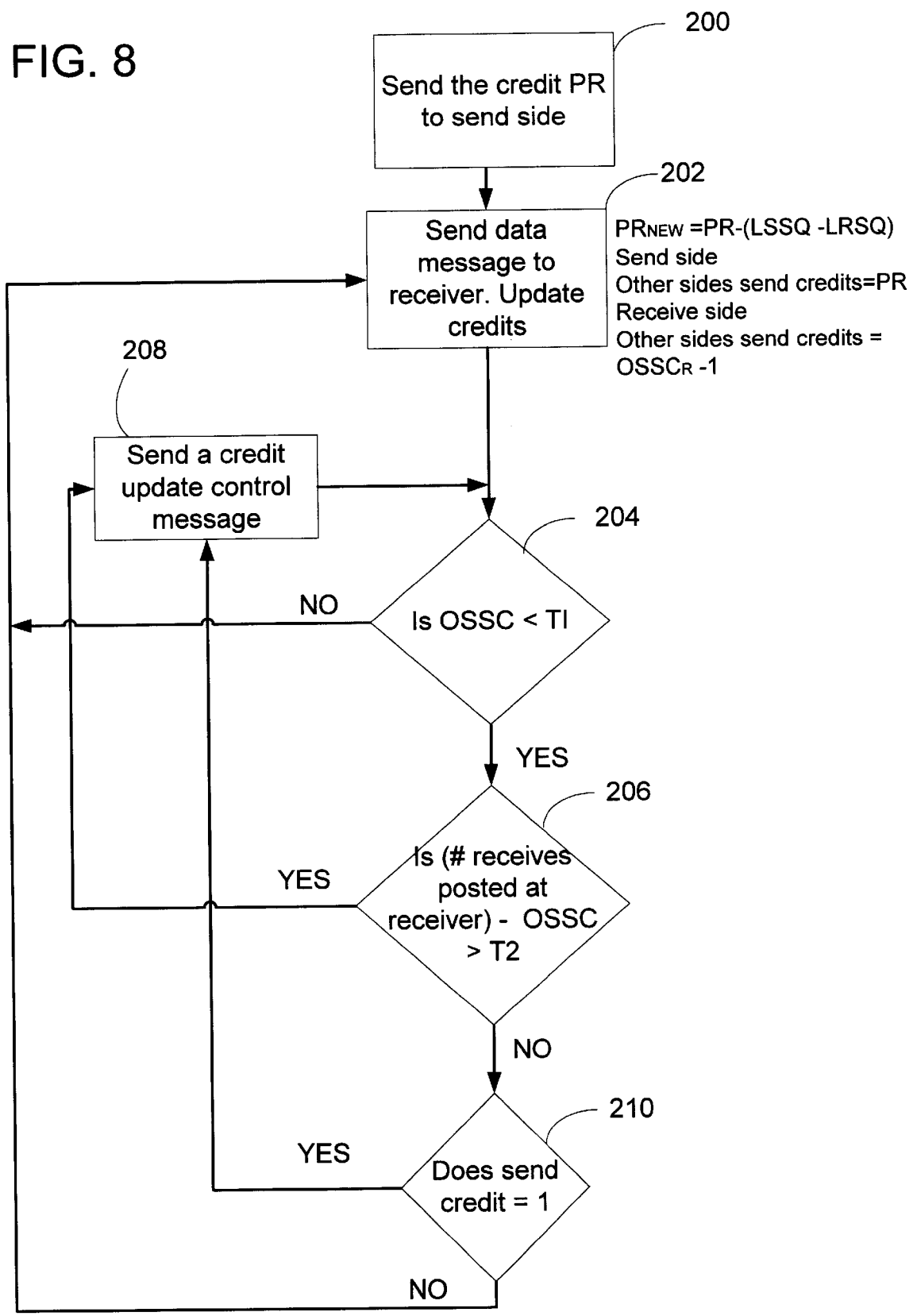
FIG. 8 is a flow chart illustrating a data transfer process in which credits are used to ensure that a receiving device has a buffer posted to receive messages when messages are transferred between a receiving device and a sending device.

FIGS. 6–8 show a flow diagram representative of the steps the switches 120, 126 take during data transfers. If the switches 120, 126 decide that RDMA data transfer is to be used, the switches 120, 126 enter into a discovery mode 150. The purpose of discovery mode is to determine the behavior of the application 132 receiving the data. If the behavior is consistent for a select number of data transfers, the switch 126 will adapt the way it provides data to the application 132 to provide the best performance for the application 132 in use. Steps 150 to 178 in the flow chart of FIGS. 6 and 7 are representative of the steps that each switch's 120, 126 protocol performs in discovery mode.

The switch 126 copies an initial portion of the data to a message buffer 148 and sends the initial portion of the data in an initial message to switch 120 via message buffer 125 (step 152). The initial message includes information to indicate the size of the data to be transferred.

Switch 120 then checks whether application 132 has posted receive buffers 134 (step 154). Switch 126 will not send any additional data until switch 120 notifies it through a message that application 132 has posted receive buffers 134. To avoid a possible deadlock where switch 126 is waiting for an indication that application 132 has posted receive buffers 134 and application 132 has not posted receive buffers 134, each switch 120, 126 periodically scans connections it is overseeing to see if a deadlock exists.

The switch 120 waits for the application 132 to post receive buffers 134 (step 156). If the periodic scan has occurred a number of times, preferably two, and the application has still not posted receive buffers 134, the switch 126 will send the remainder of the data in messages (step 158).

If the application 132 has posted receive buffers 134, the switch 120 determines if the size of the receive buffers 134 is large enough to justify the cost of RDMA (step 160). If the size of the receive buffers 134 is not large enough, the switch 120 sends a message 123 to switch 126 instructing switch 126 to send the remainder of the data in messages (step 162). If the size of the receive buffers 134 is large enough for RDMA, switch 120 and witch 126 transfer data into the receive buffer (step 164) as described below.

If the size of the receive buffers 134 is large enough to justify the cost of RDMA, then local switch 120 sends a message 123 to remote switch 126. The message 123 includes the location of the application's set of receiving buffers 134, and whether the application 132 posted the set of receiving buffers 134 directly or waited until it received an indication that data was available to be received. Remote switch 126 transfers an amount of data equal to the size of the set of receiving buffers 134 from the set of transmission buffers 138 into the set of receiving buffers 134 using one or more RDMA write operations. Remote switch 126 continues to transfer data into the set of receiving buffers 134 as more buffers are posted into the set of receiving buffers 134 until all of the data is transferred. The remote switch 126 then sends a message 123 to local switch 120 indicating that the data transfer is complete and also notifies application 136 that the data transfer is complete. Local switch 120 then signals the application 132 that the data transfer is complete.

The switches 120, 126 then determine the behavior of the application 132 (step 166). There are three representative modes in which the application 132 could receive data. One mode is the large receive mode where the application 132 posted the set of receiving buffers 134 directly when it accepted the request to receive data. Another mode is the small-receive-large-receive mode where the application 132 waited until it received an indication that data was available to be received before it posted the set of receiving buffers 134. Another mode is the small receive mode where the application 132 posted the set of receiving buffers 134, but the size of the set of receiving buffers 134 is not large enough to justify the cost of RDMA operations.

For subsequent data transfers, the switches 120, 126 repeat steps 152 to 166 while the application's behavior is determined. The remote switch 126 determines if the application's behavior during the data transfer is the same representative mode as the previous data transfer (step 168). The switches 120, 126 repeat steps 152 to 168 until the application's behavior is determined to be the same representative mode for a predetermined number of times, preferably three (steps 170 and 172).

If the application's behavior is determined to be the same representative mode for the predetermined number of times, the switches 120, 126 adapt the way data is transferred on subsequent data transfers according to the application's behavior (step 174). If the application's behavior changes during subsequent data transfers, the switches 120, 126 reenter the discovery mode (step 176). Otherwise, the switches 120, 126 continue to transfer data according to the application's behavior (step 178).

If the remote switch 126 determines that the application's behavior is the small receive mode, remote switch 126 sends all data in messages. If the application 132 posts a set of receiving buffers 134 that is large enough for RDMA, local switch 120 sends a message 123 to remote switch 126 to reenter discovery mode.

If the remote switch 126 determines that the application's behavior is the small-receive-large-receive mode, then the switches 120, 126 can transfer the data in one of two ways. The first way is only available if the SAN provider 93 supports transferring data directly from a remote buffer to a specified local buffer through RDMA read operations. Remote switch 126 sends a message 123 to local switch 120. The message 123 contains an initial portion of the data and also includes the location of the application's set of transmission buffers 138 and the size of the data to be transferred. Local switch 120 uses the initial portion of the data received through message 123 to satisfy the application's initial small receive request. Application 132 then posts a large receive buffer. Local switch 120 then transfers the data from the set of transmission buffers 138 directly into the application's set of receiving buffers 134 using one or more RDMA read operations. Local switch 120 transfers an amount of data equal to the size of the set of receiving buffers 134 from the set of transmission buffers 138 into the set of receiving buffers 134. Local switch 120 continues to transfer data into the set of receiving buffers 134 as more buffers are posted into the set of receiving buffers 134 until all of the data is transferred. Once all of the data is transferred, the local switch 120 sends a message 123 to remote switch 126 indicating that the data transfer is complete. The remote switch 126 then signals the application 136 that the data transfer is complete. If the application 136 requests to send a small amount of data that is not large enough for RDMA, remote switch 126 sends data through a message 123 and not through RDMA. The data is then copied by local switch 120 to the set of receiving buffers 134 and on subsequent data transfers, the switches 120, 126 continue in the small-receive-large-receive mode.

If RDMA read is not supported, then the switches 120, 126 transfer data using RDMA write operations. If the size of the set of receiving buffers 134 is large enough, then local switch 120 sends a message 123 to remote switch 126. The message 123 includes the location of the application's set of receiving buffers 134. Remote switch 126 transfers an amount of data equal to the size of the set of receiving buffers 134 from the set of transmission buffers 138 into the set of receiving buffers 134 using one or more RDMA write operations. As more receiving buffers 134 are posted by the application 132, local switch 120 informs remote switch 126 of these buffers through messages 123. Remote switch 126 continues to transfer data into the set of receiving buffers 134 as more buffers are posted into the set of receiving buffers 134 until all of the data is transferred. The remote switch 126 then sends a message 123 to local switch 120 indicating that the data transfer is complete and also notifies application 136 that the data transfer is complete. Local switch 120 then signals the application 132 that the data transfer is complete.

If the remote switch 126 determines that the application's behavior is the large receive mode, remote switch 126 sends a message 123 informing the local switch 120 to change modes. After sending this message, the remote switch 126 becomes passive in the sense that it will not initiate data transfers any more. Instead, all data transfers are initiated by the local switch 120. When application 132 posts a set of receive buffers 134, local switch 120 sends a message 123 to remote switch 126 which includes the size of the set of receive buffers 134 and the location of the set of receive buffers 134.

When application 136 requests that a large block of data be sent, remote switch 126 transfers an amount of data equal to the size of the set of receiving buffers 134 from the set of transmission buffers 138 into the set of receiving buffers 134 using one or more RDMA write operations. Remote switch 120 continues to transfer data into the set of receiving buffers 134 as more buffers are posted into the set of receiving buffers 134 until all of the data is transferred. The remote switch 126 then sends a message 123 to local switch 120 indicating that the data transfer is complete and also notifies application 136 that the data transfer is complete. Local switch 120 then signals the application 132 that the data transfer is complete.

If the application 136 requests to send a small amount of data that is not large enough for RDMA, remote switch 126 sends data through a message 123 via message buffers 142, 131 and not through RDMA. The data is then copied by local switch 120 from a message buffer 125 to the set of receiving buffers 134. On subsequent data transfers, the switches 120, 126 continue to transfer data in large receive mode. If the application 132 changes its behavior and instead of directly posting a set of receive buffers 134, it posts a set of receive buffers 134 that is not large enough for RDMA operations, or waits for an indication that data is available to be received before posting a set of receive buffers 134, then the local switch 120 sends a message 123 to the remote switch 126 to go back to discovery mode. If the application 132 does not post a set of receiving buffers 134 or wait for incoming data, a deadlock could occur. The periodic scan detects this and the switch 126 sends a message to switch 120 to reenter the discovery mode and switch 126 sends the remainder of the data in messages.

During data transfers in any of the modes, the switches 120, 126 send messages 123 to each other concerning both applications' requests and responses to send or receive data. There can be instances where these messages become outdated. To account for outdated messages, the switch 120, 126 on the side that has an application that has already posted a set of receiving buffers of sufficient size to receive multiple messages, will only allow one message to be transferred into that set of receiving buffers. Then the switches 120, 126 detect outdated information by the steps as follows. (1) The switch 120, 126 on the side that is sending data to an application keeps track of the number of messages sent which contain an application's data. (2) The switch 120, 126 on the side that is receiving data keeps track of the number of messages received which contain application data and includes this number when it sends a message to the sending side switch indicating that the application that is receiving data has a set of receiving buffers posted and the size of the set of receiving buffers posted is large enough for RDMA. (3) The switch 120, 126 on the side that is sending data then uses the difference in the number of data messages sent and the number received at the time the switch 120, 126 on the side that is receiving data sent the message in step 2 to decide if the set of receiving buffers under question is still available or has been satisfied using data from messages. If it has been satisfied using data from messages, then the send-side simply discards this message as being outdated.

If the switches 120, 126 decide that messages should be used to transfer data or when the switches 120, 126 send messages during RDMA data transfers, the switches 120, 126 must ensure that when one switch sends a message, the other switch has a set of receiving buffers posted to accept the message as the SAN hardware may not have the capability to buffer data.

Turning now to FIG. 8, the flow control protocol to synchronize data transfer for messages ensures that a receiving buffer is available when a message is sent by using credits as explained below. For purposes of explanation, switch 120 is on the side where application 132 is receiving data and switch 126 is on the side where application 136 is sending data. The switch 120 provides a credit to the switch 126, equal to the number of message buffers 125 switch 120 has currently posted. Switch 126 will not send more messages 123 than this number until it receives more credit. This ensures that a message buffer 125 is always posted when the switch 126 sends a message 123. If no credit is available and the application 136 tries to send data, then this operation will either be blocked or data will be buffered internally by the switch 126. If the switch 126 needs to send a message 123 when no credit is available, then the switch 126 will buffer the message 123 until credit becomes available.

The switch 126, in the header of each message 123 that it sends, includes the number of currently posted message buffers 131 denoted by initials PR for "posted receives" as indicated by step 200. If the switch 126 is multithreaded, it may gain performance advantages by not using locks to synchronize operations on the same socket by different threads. As a result, data can become misordered, despite the fact that the SAN provider delivers data in order. To account for this, each message 123 is also assigned a sequence number to ensure that data is put back into the correct order using the sequence numbers.

The header also includes the sequence number of the last message the switch 126 has received before sending this message, denoted by the initials LRSQ for "last received sequence number". Upon receiving this message, the switch 120 uses this information to update its send credit as indicated in step 202 according to the formula New send credit=$PR-(LSSQ-LRSQ)$ where LSSQ ("last sent sequence number") is the sequence number of the last message sent by the switch 120.

In some instances such as sustained unidirectional data flow, switch 126 may run out of send credit and credit cannot be refreshed as part of the data transfer process. In such situations, the switch 120 on the side where an application is receiving data will send a special credit update control message to switch 126.

There can be situations where switch 126 sends a message 123 and runs out of credit. Switch 120 realizes that switch 126 is out of credit, so as soon as one receive buffer is freed up, it sends a credit update control message back to switch 126, but this only gives switch 126 one credit. The cycle keeps repeating and results in high overhead (one control message for each data transfer message).

To avoid this situation, each switch 120, 126 needs to track the other switch's send credit. Each switch maintains a variable OtherSidesSendCredit which is updated as follows:
1. When a switch sends a message to the other switch, then the switch sets:
   OtherSidesSendCredit=the PR value in the outgoing message's header
2. Upon receiving a message:
   OtherSidesSendCredit=OtherSidesSendCredit−1

A credit update message is sent only when the OtherSidesSendCredit falls below a predetermined threshold T1, and the number of receive buffers 125 posted at the side receiving data is greater than OtherSidesSendCredit by a predetermined threshold T2.

If the OtherSidesSendCredit is greater than the predetermined threshold Ti, then no credit update message is required as indicated by step 208. If the OtherSidesSendCredit is less than the predetermined threshold Ti, then the number of receive buffers 125 is checked. If the number of receive buffers 125 is greater than the predetermined threshold T2, the switch 120 will send a credit update control message to switch 126 as indicated by step 206 and step 208. This ensures that every credit update message causes the sending switch's credit to increase by at least T2, and this avoids the one control message for each data transfer message scenario as long as T2 is greater than 1.

The value of T2 is based on the total number of receive buffers allocated per connection. For 10–12 receive buffers, a value of 5–6 is exemplary.

The value of T1 should be chosen so that in case of a uni-directional data flow, the receiving side has sufficient time to send a credit update message to the sending side before the sending side blocks the message from being sent due to insufficient send credit. A value of 3–4 is exemplary.

Credit update messages need to be flow controlled themselves to avoid a deadlock where both switches end up with zero send credit, and even though they have receives posted, they cannot update each other's send credit. This deadlock is avoided by only allowing a credit update message to be sent if send credit falls to 1 as indicated by step 210. If send credit is 1, all messages containing application data are blocked and all other messages, other than a credit update message, are buffered and queued internally by the switches. Then, when all the conditions to send a credit update message are satisfied, the final credit is used up to update the other switch's send credit.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having computer-executable instructions for directing network data transfer, the instructions comprising:
   building a table mapping local internet protocol sub-networks to a plurality of alternative transport providers, each of the alternative transport providers capable of providing multi-gigabytes of data per second;
   detecting a call by a first application executing on the computer to transfer data to a second application;
   determining whether the call identifies a sub-network served by one of a plurality of alternative transport providers, the determining via consulting the table of local internet protocol (IP) sub-networks served by the plurality of alternative transport providers, the consulting to determine if a local name referenced in the call matches one of the plurality of alternative transport providers;
   if the call identifies a sub-network served by one of the plurality of alternative transport providers:
      selecting one of the plurality of alternative transport providers;
      invoking said one of the plurality of alternative transport providers to transfer data through said sub-network by creating a socket and emulating semantics of the primary transport provider;
      binding the socket to a primary transport provider address matching a previously-created socket; and
   if the call identifies a sub-network served by one of the plurality of alternative transport providers, invoking a primary transport provider to create a primary transport socket for transferring data to the second application and storing a descriptor for the primary transport socket in a private data structure associated with the primary transport socket, the private data structure storage enabling service by the primary transport provider should one of the plurality of alternative transport providers fail to process the call.

2. The computer-readable medium of claim 1 wherein the primary transport provider is a TCP/IP provider.

3. The computer-readable medium of claim 1 wherein one of said plurality of alternative transport providers is a system area network provider.

4. The computer-readable medium of claim 1 wherein the first application is located on a first device and the second application is located on a second device, each of the first device and the second device having a network address, the step of determining whether the first and second applications are connected in a sub-network served by one of the plurality of alternative transport providers comprises:
   comparing the network address of the first device and the network address of the second device to a table of network addresses supported by the plurality of alternative transport providers;
   if the network address of the first device and the network address of the second devices are listed in the table and are in the same sub-network, indicating that the first and second applications are connected in a sub-network served by one of the plurality of alternative transport providers.

5. A computer-readable medium having computer-executable instructions for directing network data, the computer-executable instructions comprising:
   detecting a call by a first application to transfer data to a second application;
   determining whether the first and second applications are connected in a sub-network served by a plurality of alternative transport providers;
   if call identifies a sub-network served by one of the plurality of alternative transport providers:
      invoking at least one of the plurality of alternative transport providers to transfer data through said sub-network by creating a socket;
      binding the socket to a primary transport provider address matching a previously-created socket; and
      controlling data transfers from the first application to the second application by:
         (a) transferring in an initial transfer mode from the first application to the second application a pre-selected number of initial data blocks each having a size greater than a pre-selected threshold size; the transferring of each of the initial data blocks in the initial transfer mode including:
            (i) receiving a transfer request for said each initial data block sent by the first application;
            (ii) sending a pilot message for informing the second application that said each initial data block is available to be sent;
            (iii) detecting whether the second application posts a receive buffer when receiving the transfer request for said each initial data block or when the second application is informed that said each data block is available to be sent;
            (iv) determining whether the receive buffer exceeds the threshold size;
            (v) if the second application posts a receive buffer exceeding the threshold size:
               (i) locating the receive buffer posted by the second application;
               (ii) transferring the initial data block to the second application by direct memory access to the receive buffer;
         (b) if for each of the initial data blocks the second application posts a receive buffer exceeding the threshold size when sending a transfer request for said each initial data block, transferring subsequent data blocks having sizes greater than the threshold size in a large-block transfer mode including, for each subsequent data block:
            (i) locating a receive buffer posted by the second application;
            (ii) transferring said each subsequent data block to the second application by direct memory access to the receive buffer; and
   if the call identifies first and second applications that are not connected in a sub-network served by one of the plurality of alternative transport providers, invoking the primary transport provider to create a primary transport socket for transferring data to the second application and storing a descriptor for the primary transport socket in a private data structure associated with the primary transport socket, the private data structure storage enabling service by the primary transport provider should one of the plurality of alternative transport providers fail to process the call.

6. The computer-readable medium of claim 5 wherein said one of a plurality of alternative transport providers has computer-executable instructions for performing steps comprising:

(a) providing a shared memory for use between a user mode driver and a kernel mode driver, the shared memory having address space for receiving data;
(b) enabling at least one hardware interrupt for indicating when a data transfer completes; and
(c) when a data transfer completes:
(i) adding an entry to a list in the shared memory that identifies each address space that has received data; and
(ii) setting a flag in the shared memory indicating that received data is available.

7. The computer-readable medium of claim 5 further comprising the steps of:
(d) checking, by the user mode driver, the flag when said alternative transport provider invokes an entry point in the user mode driver; and
(e) if the flag is set:
(i) processing, by the user mode driver, the received data; and
(ii) indicating to the alternative transport provider that the processing is complete.

8. The computer-readable medium of claim 5 further comprising the steps of:
(d) determining, at predetermined intervals, if an address space has received data; and
(e) if the address space has the received data for at least one of the predetermined intervals, signaling, by the kernel mode driver, the user mode driver to process the received data.

9. A computer-readable medium having computer-executable instructions for directing network data transfer in a computer and controlling data transfers from a first application to a second application in a computer environment having a plurality of data transfer modes, the computer-executable instructions comprising:
detecting a call to be received by the first application executing on the computer to transfer data to the second application;
determining whether the first and second applications are connected in a sub-network served by a plurality of alternative transport providers;
if the call identifies a sub-network served by one of the plurality of alternative transport providers:
invoking said one of the plurality of alternative transport providers to transfer data through said sub-network by creating a socket;
detecting a data transfer behavior of the receiving first application while in a first transfer mode;
if the data transfer behavior is different from the first transfer mode:
switching the data transfer mode from the first transfer mode to a second transfer mode;
sending the data using the second transfer mode by binding the socket to a primary transport provider address matching a previously-created socket; and
if the call identifies first and second applications that are not connected in a sub-network served by one of the plurality of alternative transport providers, invoking the primary transport provider to create a primary transport socket for transferring data to the second application and storing a descriptor for the primary transport socket in a private data structure associated with the primary transport socket, the private data structure storage enabling service by the primary transport provider should one of the plurality of alternative transport providers fail to process the call.

10. The computer-readable medium of claim 9 wherein the step of detecting the transfer behavior of the receiving application comprises the steps of:
transferring in the first transfer mode from the sending application to the receiving application a pre-selected number of initial data blocks each having a size greater than a pre-selected threshold size; the transferring of each of the initial data blocks in the initial transfer mode including:
receiving a transfer request for said each initial data block sent by the sending application;
sending a pilot message for informing the receiving application that said each initial data block is available to be sent;
detecting whether the receiving application posts a receive buffer when receiving the transfer request for said each initial data block or when the receiving application is informed that said each data block is available to be sent;
determining whether the receive buffer exceeds the threshold size;
if the receiving application posts a receive buffer exceeding the threshold size:
locating the receive buffer posted by the receiving application; and
transferring the initial data block to the receiving application by direct memory access to the receive buffer.

11. The computer-readable medium of claim 10 wherein the step comprising switching the data transfer mode from a first transfer mode to the second transfer mode comprises the step of switching the data transfer mode for subsequent data blocks having sizes greater than the threshold size from the first transfer mode to a large-receive transfer mode if for each of the initial data blocks the receiving application posts a receive buffer exceeding the threshold size when sending a transfer request for each initial data block.

12. The computer-readable medium of claim 11 wherein the step of sending the data using the second transfer mode comprises for each subsequent data block:
(i) locating a receive buffer posted by the receiving application;
(ii) transferring said each subsequent data block to the receiving application by direct memory access to the receive buffer.

13. The computer-readable medium of claim 9 wherein the step of switching the data transfer mode from the first transfer mode to the second transfer mode comprises the step of switching the data transfer mode to a small-receive-large-receive transfer mode if the transfer behavior of the receiving application is to post a receive buffer exceeding a threshold size when the receiving application is informed that a data block is available to be sent.

14. The computer-readable medium of claim 9 wherein the step of detecting the transfer behavior comprises the step of detecting if the receiving application posts receive buffers smaller than the threshold size when the receiving application receives a transfer request or when the receiving application is informed that each data block is available to be sent.

15. The computer-readable medium of claim 14 wherein the step of switching the data transfer mode from a first transfer mode to a second transfer mode comprises the step of switching the data transfer mode from the first transfer mode to a small-receive transfer mode if the transfer behavior is that the receiving application posting receive buffers smaller than the threshold size when the receiving application receives the transfer request or when the receiving application is informed that each data block is available to be sent.

16. The computer-readable medium of claim 15 wherein the step of sending the data using the second transfer mode comprises sending the data in a plurality of messages, each message having a portion of the data for each subsequent data block.

17. The computer-readable medium of claim 9 wherein the step of detecting the transfer behavior comprises the step of detecting whether an initial data block and a subsequent data block has been transferred within a predetermined time.

18. The computer-readable medium of claim 17 wherein the step of switching the data transfer mode from the first transfer mode to the second transfer mode comprises the step of switching the data transfer mode to small receive mode if the transfer behavior is that the initial data block and the subsequent data block has not been transferred within the predetermined time.

19. The computer-readable medium of claim 18 wherein the step of sending the data using the second transfer mode comprises transferring one of the initial data block and the subsequent data block in messages, each message containing a portion of one of the initial data block and the subsequent data block.

20. A method for directing network data transfer in a computer having a primary transport provider and a plurality of alternative transport providers, the steps comprising:
   detecting a call by a first application executing on the computer to transfer data to a second application;
   determining whether the first and second applications are connected in a sub-network served by the plurality of alternative transport providers by locating a plurality of names identifying device objects associated with the plurality of alternative transport providers in a registry;
   identifying which of the plurality of alternative transport providers are currently loaded by attempting to open each device object;
   selecting one of the plurality of alternative transport providers to transfer data through the sub-network, the one alternative transport provider being identified by an opened device object;
   diverting any messages intended for a primary transport provider by binding a socket to an internet protocol (IP) address matching a previously-created socket and
   if the call identifies first and second applications that are not connected in a sub-network served by one of the plurality of alternative transport providers, invoking the primary transport provider to create a primary transport socket for transferring data to the second application and storing a descriptor for the primary transport socket in a private data structure associated with the primary transport socket, the private data structure storage enabling service by the primary transport provider should one of the plurality of alternative transport providers fail to process the call.

21. The method of claim 20 wherein the first application is located on a first device and the second application is located on a second device, each of the first device and the second device having a network address, the step of determining whether the first and second applications are connected in a sub-network served by one of the plurality of alternative transport providers comprises:
   comparing the network address of the first device and the network address of the second device to a table of network addresses supported by the plurality of alternative transport providers;
   if the network address of the first device and the network address of the second devices are listed in the table and are in the same sub-network, indicating that the first and second applications are connected in a sub-network served by one of the plurality of alternative transport providers.

22. A computer-readable medium having computer-executable instructions for performing steps for directing network data transfer in a computer having a primary transport provider and a plurality of alternative transport providers, the computer-executable instructions comprising:
   detecting a call by a first application executing on the computer to transfer data to a second application;
   determining whether the first and second applications are connected in a sub-network served by the plurality of alternative transport providers by locating a plurality of names identifying device objects associated with the plurality of alternative transport providers in a registry;
   identifying which of the plurality of alternative transport providers are currently loaded by attempting to open each device object;
   if the first and second applications are connected in a sub-network served by the plurality of alternative transport providers:
      invoking one of the plurality of alternative transport providers to transfer data through said sub-network, the one alternative transport provider being identified by an opened device object;
      controlling data transfers from the first application to the second application, the step of controlling data transfers comprising the steps of:
         (a) transferring in an initial transfer mode from the first application to the second application a pre-selected number of initial data blocks each having a size greater than a threshold size, the transferring of each of the initial data blocks in the initial transfer mode including:
            (i) detecting whether the second application posts a receive buffer when receiving a transfer request for each initial data block or when the second application receives a message indicating that an initial data block is available to be sent;
            (ii) locating the receive buffer posted by the second application and transferring the initial data block to the second application by direct memory access to the receive buffer if the second application posts a receive buffer exceeding the threshold size;
         (b) if for each of the initial data blocks the second application posts a receive buffer exceeding the threshold size when sending a transfer request for each initial data block, transferring subsequent data blocks having sizes greater than the threshold size in a large-block transfer mode including, for each subsequent data block:
            (i) locating a receive buffer posted by the second application;
            (ii) transferring each subsequent data block to the second application by direct memory access to the receive buffer;
         (c) if, after a predetermined amount of time, no receive buffer is posted by the second application, periodically scanning connections to determine whether a deadlock exists;
         (d) if after a predetermined number of periodic scans no receive buffer is posted by the second application, sending any remaining data in messages.

23. The computer-readable medium of claim 22 wherein at least one of the plurality of alternative transport providers has computer-executable instructions for performing steps comprising
- (a) providing a shared memory for use between a user mode driver and a kernel mode driver, the shared memory having address space for receiving data;
- (b) enabling at least one hardware interrupt for indicating when a data transfer completes; and
- (c) when a data transfer completes:
  - (i) adding an entry to a list in the shared memory that identifies each address space that has received data; and
  - (ii) setting a flag in the shared memory indicating that received data is available.

24. The computer-readable medium of claim 23 further comprising the steps of:
- (d) checking, by the user mode driver, the flag when said alternative transport provider invokes an entry point in the user mode driver; and
- (e) if the flag is set:
  - (i) processing, by the user mode driver, the received data; and
  - (ii) indicating to the alternative transport provider that the processing is complete.

25. The computer-readable medium of claim 23 further comprising the steps of:
- (d) determining, at predetermined intervals, if an address space has received data; and
- (e) if the address space has the received data for at least one of the predetermined intervals, signaling, by the kernel mode driver, the user mode driver to process the received data.

26. The computer-readable medium of claim 22 further comprising the executable instructions for performing the step comprising transferring subsequent data blocks having sizes greater than the threshold in a small-receive-large-receive transfer mode if the second application posts a receive buffer exceeding a threshold size when the second application is informed that a data block is available to be sent.

27. The computer-readable medium of claim 22 having further computer-executable instructions for performing the step comprising transferring subsequent data blocks in a small-receive transfer mode if second application posts receive buffers smaller than the threshold size when the second application receives the transfer request or when the second application is informed that each data block is available to be sent.

* * * * *